US009662748B2

(12) United States Patent
Endoh et al.

(10) Patent No.: US 9,662,748 B2
(45) Date of Patent: May 30, 2017

(54) METAL NANOPARTICLE DISPERSION, METHOD FOR PRODUCING METAL NANOPARTICLE DISPERSION, AND BONDING METHOD

(71) Applicant: DOWA ELECTRONICS MATERIALS CO., LTD., Tokyo (JP)

(72) Inventors: Keiichi Endoh, Tokyo (JP); Hiromasa Miyoshi, Tokyo (JP); Takashi Hinotsu, Tokyo (JP); Satoru Kurita, Tokyo (JP); Yoshiko Kohno, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 0 days.

(21) Appl. No.: 14/787,163

(22) PCT Filed: Apr. 25, 2014

(86) PCT No.: PCT/JP2014/061678
§ 371 (c)(1),
(2) Date: Oct. 26, 2015

(87) PCT Pub. No.: WO2014/175417
PCT Pub. Date: Oct. 30, 2014

(65) Prior Publication Data
US 2016/0101486 A1    Apr. 14, 2016

(30) Foreign Application Priority Data
Apr. 26, 2013   (JP) .................................. 2013-093801

(51) Int. Cl.
*B23K 31/02*    (2006.01)
*B23K 35/02*    (2006.01)
(Continued)

(52) U.S. Cl.
CPC .......... *B23K 35/025* (2013.01); *B22F 1/0022* (2013.01); *B22F 1/0062* (2013.01);
(Continued)

(58) Field of Classification Search
CPC ...... B23K 35/025; B23K 35/006; B23K 1/00; B23K 1/0016; B23K 2201/36–2201/42;
(Continued)

(56) References Cited

U.S. PATENT DOCUMENTS 7,357,884 B2 *   4/2008   Fujii ....................... C09D 11/30
                                                    252/502
8,158,032 B2 *   4/2012   Liu ......................... B41M 3/006
                                                    252/514
(Continued)

FOREIGN PATENT DOCUMENTS

JP          3942816 B2      7/2007
JP       2008150701 A       7/2008
(Continued)

OTHER PUBLICATIONS

Aug. 5, 2014 International Search Report issued in International Patent Application No. PCT/JP2014/061678.

*Primary Examiner* — Kiley Stoner
(74) *Attorney, Agent, or Firm* — Oliff PLC

(57) ABSTRACT

There is provided a metal nanoparticle dispersion which can be bonded at a lower temperature (for example, 200° C. or less), and enabling to obtain excellent mechanical properties and electric properties of the bonded portion, the metal nanoparticle dispersion, including: metal nanoparticles, with at least a part of a surface of each particle coated with amine A having 8 or more carbon atoms; and a dispersion medium for dispersing the metal nanoparticles, wherein the dispersion medium contains amine B which is primary, secondary, (Continued)

or tertiary amine having 7 or less carbon atoms, and which is linear alkyl amine or alkanol amine.

8 Claims, 1 Drawing Sheet

(51) Int. Cl.
    *B22F 1/00*                 (2006.01)
    *B23K 1/00*                 (2006.01)
    *B23K 35/30*              (2006.01)
    *B22F 9/24*                 (2006.01)

(52) U.S. Cl.
    CPC ............ *B23K 1/00* (2013.01); *B23K 35/3006* (2013.01); *B22F 9/24* (2013.01)

(58) Field of Classification Search
    CPC . B23K 3/0638; B23K 35/0244; B22F 1/0022; B22F 1/0062; B22F 9/24
    USPC .......................... 228/115, 248.1–248.5, 56.3, 228/179.1–180.22; 148/23–24; 252/512, 252/514
    See application file for complete search history.

(56) References Cited

U.S. PATENT DOCUMENTS

| | | | |
|---|---|---|---|
| 8,361,350 B2 * | 1/2013 | Wu | C09D 11/36 252/500 |
| 8,372,485 B2 * | 2/2013 | Mosley | C09D 11/52 106/1.05 |
| 2007/0134491 A1 * | 6/2007 | Atsuki | B01F 17/0078 428/402 |
| 2008/0173398 A1 * | 7/2008 | Yasuda | B22F 1/0014 156/326 |
| 2008/0206488 A1 * | 8/2008 | Chung | C09D 5/24 427/596 |
| 2008/0207934 A1 | 8/2008 | Kim et al. | |
| 2009/0029148 A1 * | 1/2009 | Hashimoto | B01J 13/0043 428/323 |
| 2009/0274833 A1 * | 11/2009 | Li | B22F 1/0022 427/123 |
| 2010/0283013 A1 * | 11/2010 | Sato | B22F 1/0018 252/514 |
| 2012/0048426 A1 * | 3/2012 | Ishizaki | B22F 1/0018 148/24 |
| 2013/0248775 A1 * | 9/2013 | Kurihara | B22F 9/30 252/512 |
| 2013/0334470 A1 * | 12/2013 | Kurihara | B22F 1/02 252/514 |
| 2014/0312284 A1 * | 10/2014 | Liu | C09D 11/52 252/514 |
| 2014/0346412 A1 * | 11/2014 | Okamoto | B22F 9/30 252/514 |
| 2015/0083474 A1 * | 3/2015 | Kawamura | H05K 1/097 174/257 |
| 2015/0206618 A1 * | 7/2015 | Kozu | B22F 9/24 252/514 |
| 2015/0224578 A1 * | 8/2015 | Okamoto | B22F 9/30 252/514 |
| 2015/0225588 A1 * | 8/2015 | Iguchi | B22F 9/24 106/31.92 |
| 2015/0231698 A1 * | 8/2015 | Kurihara | B22F 1/02 252/514 |

FOREIGN PATENT DOCUMENTS

| | | |
|---|---|---|
| JP | 2009161808 A | 7/2009 |
| JP | 4928639 B2 | 5/2012 |

* cited by examiner (a)
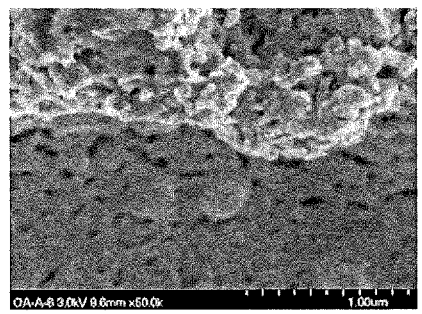
EXAMPLE 1
(b)
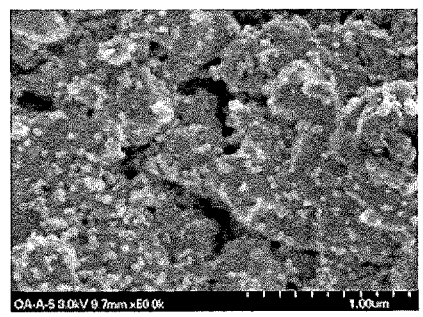
EXAMPLE 2
(c)
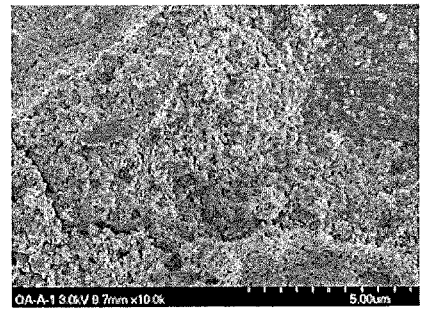
COMPARATIVE EXAMPLE 1
(d)
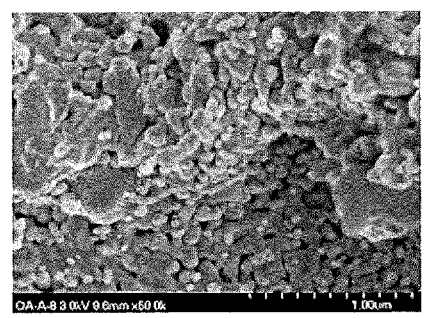
COMPARATIVE EXAMPLE 2

METAL NANOPARTICLE DISPERSION, METHOD FOR PRODUCING METAL NANOPARTICLE DISPERSION, AND BONDING METHOD

TECHNICAL FIELD

The present invention relates to a metal nanoparticle dispersion, a method for producing a metal nanoparticle dispersion, and a bonding method, and more specifically to the metal nanoparticle dispersion in which metal nanoparticles can be sintered at a lower temperature by containing an organic material in a dispersion medium as a sintering aid, the method for producing the metal nanoparticle dispersion and the bonding method using the metal nanoparticle dispersion as a bonding material.

DESCRIPTION OF RELATED ART

Electronic components mounted on each kind of electronic apparatuses exhibit a function by mechanically and electrically bonding it to a substrate, etc. Accordingly, it is important to perform excellent bonding. For example, bonding by soldering can be given as the bonding method. Conventionally, a solder (lead solder) containing lead is used as a solder material, but an alternative technique of the lead solder is requested, from an environmental point of view.

A technique of bonding between materials using a paste containing a metal nanoparticle having a particle size of nano (nm) order, is known as one of the alternative techniques. The metal nanoparticle exhibits a low-temperature sinterability because of its lower melting point than a metal of a bulk, depending on a height of a surface activity due to a quantum size effect. The paste containing the metal nanoparticles is applied between objects to be bonded (for example, between an electronic component and the substrate) which is then heated, to thereby bond the objects to be bonded integrally with the metal nanoparticles.

On the other hand, there is a problem that the metal nanoparticles are easily agglomerated dye to the height of the surface activity, and the agglomerated metal nanoparticles cannot exhibit the low-temperature sinterability which is inherent in the metal nanoparticles. In order to cope with such a problem, patent documents 1 and 2 disclose a technique of coating the surface of a silver nanoparticle with an organic material, and sintering the silver nanoparticles at about 250° C. by preventing the agglomeration of the silver nanoparticles, to thereby bond the metal nanoparticle dispersion.

PRIOR ART DOCUMENT

Patent Document

Patent document 1: U.S. Pat. No. 3,942,816
Patent document 2: U.S. Pat. No. 4,928,639

SUMMARY OF THE INVENTION

Problem to be Solved by the Invention

However, a lower temperature (for example, 200° C. or less) bonding is requested for bonding components such as LED and strain sensor, etc. However, methods of patent documents 1 and 2 have a problem that sintering of the metal nanoparticles is insufficient at such a low temperature, thus making it difficult to perform excellent bonding.

Therefore, conventionally, paste with silver particles, etc., dispersed in cured resin, is used for such a bonding of components. However, there is a problem that thermal properties and electric properties of a bonded portion obtained by bonding using the paste, are more deteriorated than the properties of the bonded portion obtained by bonding using the metal nanoparticles.

In view of the above-described circumstance, the present invention is provided, and an object of the present invention is to provide the metal nanoparticle dispersion which can be bonded at a lower temperature (for example, 200° C. or less), and enabling to obtain excellent mechanical properties and electric properties of the bonded portion.

It is found by inventors of the present invention, that sintering of the metal nanoparticles is promoted at a lower temperature, by using an effect of peeling-off an organic material with which each metal nanoparticle is coated, by another organic material contained in a dispersion medium, which leads to completion of the present invention.

Means for Solving the Problem

Namely, according to an aspect of the present invention, there is provided a metal nanoparticle dispersion, including:
metal nanoparticles, with at least a part of a surface of each particle coated with amine A having 8 or more carbon atoms; and
a dispersion medium for dispersing the metal nanoparticles,
wherein the dispersion medium contains amine B which is primary, secondary, or tertiary amine having 7 or less carbon atoms, and which is linear alkyl amine or alkanol amine.

Preferably, an average particle size of the metal nanoparticles is 1 to 200 nm.

Preferably, 0.1 to 1 pts.mass of the amine B is contained, based on 100 pts.mass of the metal nanoparticles.

Preferably, a metal constituting the metal nanoparticles contains silver.

Preferably, the amine A is octyl amine, and the amine B is at least one kind selected from triethanolamine, diethanolamine, and butylamine.

According to another aspect of the present invention, there is provided a method for producing a metal nanoparticle dispersion, including:
making amine A having 8 or more carbon atoms, adhered to at last a part of each surface of metal nanoparticles; and
adding amine B which is primary, secondary, or tertiary amine having 7 or less carbon atoms, and which is linear alkyl amine or alkanol amine, to a dispersion medium for dispersing the metal nanoparticles.

According to another aspect of the present invention, there is provided a bonding method, including bonding a plurality of objects to be bonded, using a bonding material containing the metal nanoparticle dispersion of any one of the abovementioned aspects.

Advantage of the Invention

According to the present invention, there is provided a metal nanoparticle dispersion which can be bonded at a lower temperature (for example, 200° C. or less), and enabling to obtain excellent mechanical properties and electric properties of the bonded portion.

BRIEF DESCRIPTION OF THE DRAWINGS

FIG. 1 is an observation image obtained by a scanning electron microscope, after rupture of a bonded portion which is bonded using a silver nanoparticle dispersion of an example of the present invention and a comparative example.

DETAILED DESCRIPTION OF THE INVENTION

The present invention will be described hereafter in the following order.
1. Metal nanoparticle dispersion
2. Method for producing the metal nanoparticle dispersion
3. Bonding method using the metal nanoparticle dispersion
4. Effect of this embodiment

1. Metal Nanoparticle Dispersion

The metal nanoparticle dispersion of this embodiment contains metal nanoparticles and a dispersion medium, and the metal nanoparticles are dispersed in the dispersion medium. The metal nanoparticle dispersion may be a liquid having a relatively low viscosity, or may be a paste having a relatively high viscosity.

As the metal nanoparticle, it is preferable that the metal constituting the metal nanoparticles contains the metal having conductivity. In this embodiment, silver and silver alloy, etc., are given for example, and silver is preferable from a viewpoint of conductivity and sintering property at a low temperature. Further, an average particle size of the metal nanoparticles is preferably 1 to 200 nm, and more preferably 20 to 100 nm. In addition, the average particle size of the metal nanoparticles is calculated by measuring the particle size of prescribed numbers of metal nanoparticles by a scanning electron microscope (SEM), as an average value thereof.

Such metal nanoparticles have high surface activity, and therefore are easily agglomerated. When the metal nanoparticles are agglomerated, properties (for example, low-temperature sintering property) inherent in the metal nanoparticles, is not exhibited. Therefore, in this embodiment, the surface of each metal nanoparticle is coated with amine A which is an amine compound. That is, amine A forms a protective colloid of the metal nanoparticles, thus preventing the agglomeration of the metal nanoparticles. At least a part of its surface is coated with amine A, and it is more preferable that the whole surface of the metal nanoparticle is coated with amine A in this embodiment.

Amine A is the amine having 8 or more carbon atoms, and in this embodiment, amine A is preferably a primary amine represented by a chemical formula $RNH_2$ (R is an alkyl group). Specifically, amine A is preferably at least one of octylamine, nonylamine, and decylamine. By forming an amine compound as a protective colloid of the metal nanoparticles during heating, amine A is desorbed and decomposed from the surface of each metal nanoparticle, and thereafter the metal nanoparticles are agglomerated and sintered.

The dispersion medium is capable of dispersing the metal nanoparticles, and is constituted of a medium containing amine B which is a different amine compound from amine A. In this embodiment, the surface of the metal nanoparticle is coated with amine A, and therefore the metal nanoparticles are likely to be hardly agglomerated. Accordingly, various solvents can be used as the medium. In this embodiment, it is preferable to use a polar solvent. Specifically, alcohol, diol, terpene alcohol, and glycol ether, etc., can be given for example, and more specifically octanol, decanol, butanediol, hexanediol, octanediol, terpineol, diethylene glycol monobutyl ether, and triethylene glycol dimethyl ether, etc., can be given for example.

Amine B is a linear alkyl amine or alkanol amine having 7 or less carbon atoms, which is a primary, secondary, or tertiary amine. Namely, amine B is an amine compound having less carbon atoms than amine A. The amine B is contained in the dispersion medium, but when it is heated, amine B actions to peel-off amine A with which the surface of the metal nanoparticle is coated, and decomposed and evaporated. Therefore, amine A is easily desorbed, decomposed, or evaporated from the surface of the metal nanoparticle at a lower temperature, compared to a case that amine B is not present in the dispersion medium.

As a result, it is possible to decrease a temperature at which the metal nanoparticles are agglomerated and sintered, compared to a case that amine B is not present in the dispersion medium. In other words, sintering of the metal nanoparticles is promoted at a lower temperature compared to a conventional example, to thereby obtain an integral body of the metal nanoparticles as a metal. That is, amine B functions as a sintering aid of the metal nanoparticles.

In addition, according to this embodiment, amine B is dissolved in the dispersion medium and evenly contained therein, and therefore capable of surrounding amine A coating the surface of the metal nanoparticle in all directions. Accordingly, a peeling effect by the abovementioned amine B can be sufficiently exhibited.

As amine B, specifically, at least one selected from triethanolamine, diethanolamine, monoethanolamine, 7-amino-1-heptanol, 6-amino-1-hexanol, 5-amino-1-pentanol, 4-amino-1-butanol, 3-amino-1-propanol, dimethylaminoethanol, heptyl amine, hexylamine, pentylamine, and butylamine, is preferable.

In this embodiment, amine A and amine B are preferably a combination of the abovementioned amine compounds. Particularly preferably, amine A is octyl amine, amine B is at least one selected from triethanol amine, diethanol amine, and butyl amine.

The metal nanoparticle dispersion of this embodiment may contain a dispersant, etc., depending on desired properties.

2. Method for Producing a Metal Nanoparticle Dispersion

The method for producing a metal nanoparticle dispersion of this embodiment is not particularly limited, and can be produced by a publicly-known method. In this embodiment, the metal nanoparticle dispersion can be produced by a method shown below.

First, in this embodiment, a metal nanoparticle with its surface coated with amine A, is prepared. A commercially available metal nanoparticle may be used as the metal nanoparticle, which may be coated with amine A. However, in this embodiment, amine A is adhered to the surface of the metal nanoparticle which is precipitated by reducing the metal compound in a reaction solvent.

Specifically, when a reductive reaction is advanced, amine A is allowed to coexist in the reaction solvent for serving as a protective colloid. Thus, amine A is adhered to the surface of the metal nanoparticle which is precipitated by the reductive reaction, and the metal nanoparticle with its surface coated with amine A can be obtained.

Chlorides, nitrates, acetates, and carbonates, etc., can be given as metal compounds, and nitrates are preferable from an industrial viewpoint. Further, as a solvent used for reducing the metal compound, water is used.

An amount of amine A in the time of the reductive reaction, is preferably 0.1 to 20 equivalents relative to silver when the metal nanoparticle is silver. Further, a silver ion concentration in the reaction solvent is preferably 0.05 to 5.0 mol/L.

Subsequently, the metal nanoparticle dispersion of this embodiment may be obtained by adding amine B into the dispersion containing the metal nanoparticles with its surface coated with amine A, or the metal nanoparticle dispersion of this embodiment may be obtained by adding amine B before/after adjustment of a solid content of the dispersion or addition of the solvent, etc. Also, the metal nanoparticle dispersion may be in a paste state, using a kneading defoamer, etc. In this case, the metal nanoparticle dispersion is introduced to the kneading defoamer, to thereby form a kneaded product of this dispersion. Thereafter, paste is obtained by performing a mechanical dispersion treatment as needed.

An addition amount of amine B is preferably 0.1 to 1 pts.mass based on 100 pts.mass of the metal nanoparticles with its surface coated with amine A.

3. Bonding Method Using the Metal Nanoparticle Dispersion

Since the metal nanoparticle dispersion has the abovementioned structure, it is suitable as a bonding material used for bonding objects to objects for example. The method for bonding metal to metal using the metal nanoparticle dispersion, will be described hereafter.

First, a metal substrate and a metal chip are prepared. The surface of the substrate is coated with the metal nanoparticle dispersion. A method of coating the metal nanoparticle dispersion, is not particularly limited if the surface of the substrate can be uniformly coated. However, a printing method, a dispenser method, and a pin transfer method, etc., are given for example. The chip is mounted on the coated metal nanoparticle dispersion, and a temperature is raised to a prescribed temperature (for example, 110 to 200° C.), and the dispersion medium and amine A are removed, and the metal nanoparticle is sintered.

At this time, as described above, amine A coating the surface of the metal nanoparticle is easily desorbed from the surface, due to the presence of the amine B in the dispersion medium. Therefore, amine A is decomposed or evaporated and removed at a lower temperature than a temperate when amine B is not present. As a result, since the metal nanoparticles are integrally sintered while the temperature is set to a lower temperature (for example 200° C. or less), the substrate and the chip are strongly bonded to each other through a metal constituting the metal nanoparticles by integrally sintering the metal nanoparticles. Further, pressure may be added during bonding as needed.

As described above, by using the metal nanoparticle dispersion of this embodiment, strong bonding of metal to metal can be realized even in a case of a lower temperature (for example, 200° C. or less). When a bonding strength is emphasized, it is preferable to use the metal nanoparticle dispersion in which amine A is octyl amine, and amine B is triethanol amine.

4. Effect of this Embodiment

In the abovementioned embodiment, amine B is contained in the dispersion medium so as to allow amine A coating the surface of the metal nanoparticle, to be more rapidly desorbed. This amine B is a linear alkyl amine or alkanol amine, with less carbon atoms compared to amine A.

If the metal nanoparticle dispersion is heated to sinter the metal nanoparticles, the effect of peeling off amine A from the surface of the metal nanoparticle is exhibited, the amine A coating the surface of the metal nanoparticle to be sintered. As a result, if compared to a case when amine B is not present in the dispersion medium, amine A is rapidly desorbed from the surface of the metal nanoparticle, and the metal nanoparticles are easily sintered, thus making it possible to realize a low temperature sintering.

When the metal nanoparticle dispersion is used as the bonding material, the bonding strength can be increased, because the metal nanoparticles are sufficiently sintered even if the bonding temperature (heating temperature) is a low temperature. Also, when the metal constituting the metal nanoparticles is electrically conductive, conduction at a bonded portion is easily ensured. Accordingly, a volume resistivity at the bonded portion can be low. Therefore, the abovementioned metal nanoparticle dispersion is particularly suitable for the applications in which both of a mechanical strength and an electrical property are required, for example, the application in which electronic components are bonded to each other. Further, since the conduction is sufficiently ensured only by sintering the metal nanoparticles, there is no necessity for ensuring the conduction by further adding conductive particles of micron (μm) order.

Further, since amine B has less number of carbon atoms than amine A, usually, amine B with a small molecular weight is usually used. Accordingly, when the metal nanoparticles are sintered, amine B is rapidly decomposed or evaporated, and therefore after bonding, amine B is not remained and does not deteriorate the properties.

The bonding material here is a conductive paste, and a material to be bonded is an electric circuit on an electronic board and electronic components mounted thereon. Specifically, IC chip can be given.

In the abovementioned embodiment, the metal nanoparticle dispersion is used as the bonding material. However, the application of the metal nanoparticle dispersion is not limited to the bonding material, and for example, it may be used for the application of formation, etc., of a conductive film.

When the metal nanoparticle dispersion is used for the formation of the conductive film, the conductive film may be formed by a publicly-known method. For example, by coating the surface of the substrate, etc., with the metal nanoparticle dispersion, and applying heat treatment thereto to thereby sinter the metal nanoparticles, the conductive film having a desired resistivity can be formed at a lower temperature, compared to a case that amine B is not present in the dispersion medium. When a low resistivity is emphasized, the conductive film is preferably formed using the metal nanoparticle dispersion in which amine A is octyl amine, and amine B is diethanol amine.

As described above, the embodiments of the present invention have been described. However, the present invention is not limited to the abovementioned embodiments, and can be variously modified in a range not departing from the gist of the present invention.

EXAMPLES

The present invention will be described hereafter based on further detailed examples. However, the present invention is not limited to these examples.

Example 1

Preparation of Silver Nanoparticles

Pure water 3422 g was put in a 5 L reactor as a reaction medium, and a temperature was adjusted to 40° C. Octyl amine (special grade produced by Wako Pure Chemical Industries, Ltd. having a molecular weight of 129.24) 51.06 g (the molar ratio of amine A to silver is 2) as amine A, and hydrazine hydrate (80% solution produced by Otsuka Chemical Co., Ltd.) 6.18 g (the molar ratio of a reducing agent to silver is 2) as the reducing agent, were added into the reaction medium, and a mixture was stirred by a stirring vane at 345 rpm, while blowing a nitrogen gas at a flow rate of 200 mL/minute as an inert gas, to thereby obtain a reaction solution.

Subsequently, silver nitrate crystal (produced by Toyo Kagaku Co., Ltd.) 33.6 g was dissolved in pure water 180 g as a silver compound. This solution was added into the abovementioned reaction solution, and thereafter the mixture was stirred for 2 minutes so that silver nitrate was reduced, and a silver nanoparticle with its surface coated with octyl amine was allowed to precipitate. Next, toluene (special grade produced by Wako Pure Chemical Industries, Ltd.) 166.4 g was added as a coagulant, and the mixture was stirred for 10 minutes at 150 rpm, and the silver nanoparticles were allowed to settle and stand for 1 day, and thereafter a supernatant was removed. A concentrate obtained by this decantation was put in a 50 mL vial, and toluene 30 g was added thereinto and the mixture was stirred by shaking by hand for 1 minute, and thereafter allowed to stand for 2 to 3 minutes, and the supernatant liquid was removed. This process was repeated three times, to thereby prepare a slurry 30 g (solid portion: 70 wt %) in a dispersion state of the silver nanoparticles in toluene, with its surface coated with octyl amine.

The obtained silver nanoparticles were observed at 50,000 times magnification by SEM (S-4700 produced by Hitachi High Technologies Co., Ltd.), to thereby obtain a SEM image. In this SEM image, regarding 100 or more arbitrary silver nanoparticles, an average particle size was calculated by an image analysis software ("A 像くん" (EIZOKUN: registered trademark) produced by Asahi Kasei Engineering Co., Ltd.), and it was found that the average particle size was 35.6 nm.

(Preparation of a Silver Nanoparticle Dispersion)

Octane diol 3.7 g as a dispersion medium was added into slurry 30 g in which the silver nanoparticles were dispersed, and the mixture was stirred by shaking by hand for 1 minute, and thereafter allowed to stand for 1 hour to evaporate toluene, to thereby obtain the slurry having a solid content of 85 wt % in which the silver nanoparticles were dispersed in the octane diol.

Triethanol amine (special grade having a molecular weight of 149.2 produced by Wako Pure Chemical Co., Ltd.) 0.002 g (0.24 pts.mass. based on 100 pts.mass. of the silver nanoparticles) was mixed into the slurry 1.0 g as amine B, and the mixture was kneaded by a mortar, to thereby prepare a silver nanoparticle dispersion in a paste state.

(Bonding Test)

Bonding of Cu substrate to Cu chip was performed using the obtained silver nanoparticle dispersion. First, a metal mask (having a mask thickness of 50 μm) was placed on the Cu substrate, and the surface of the Cu substrate was coated with the silver nanoparticle dispersion paste by a printing method using a metal squeegee, to thereby form a pattern of 2.5 mm square. After coating, the Cu substrate was heated at a heating rate of 1° C./s from a room temperature to 80° C., and held at 80° C. for 10 minutes to remove octane diol, then cooled, to thereby form a film in which silver nanoparticles were dispersed on the Cu substrate.

Next, 2 mm square Cu chip was placed on this film, and a bonding under pressure was applied thereto using a flip chip bonder (M-90 produced by Hysol Co., Ltd.). Pressure-bonding condition was as follows: load of 10 MPa was added under a nitrogen atmosphere, and the Cu substrate was heated at rate of 1° C./s from 25° C. to 150° C., and held at 150° C. for 60 minutes.

Thereafter, the load was removed, and the Cu substrate was cooled to a room temperature at a rate of about 1° C./s, to thereby obtain a bonded body of the Cu substrate and the Cu chip. In order to evaluate a bonding strength of the obtained bonded body, measurement of a share strength shown below was performed.

Specifically, the measurement was performed in accordance with JIS Z 3918-5: 2003. That is, the Cu chip bonded on the Cu substrate was horizontally pushed, and a force at the time of a breakage of the bonding surface which does not withstand a pressed force, is defined as a share strength.

In this example, a test was carried out using a Bond Tester (series 4000) produced by DAGE Inco. The test was carried out at a room temperature, under conditions of shear height: 150 μm and a test speed: 5 mm/min. Table 1 shows the result. Further, a broken bonded portion after the test was observed by SEM. SEM photograph is shown in FIG. 1.

Example 2

The silver nanoparticle dispersion was prepared similarly to example 1 excluding a point that butyl amine was added as amine B instead of triethanol amine, and the bonding test was carried out similarly to example 1. The result is shown in table 1 and FIG. 1.

Comparative Example 1

The silver nanoparticle dispersion was prepared similarly to example 1 excluding a point that triethanol amine was not added as amine B, and the bonding test was carried out similarly to example 1. The result is shown in table 1 and FIG. 1.

Comparative Example 2

The silver nanoparticle dispersion was prepared similarly to example 1 excluding a point that diglycollic acid which was not an amine compound defined by amine B, was added as amine B instead of triethanol amine. Then, and the bonding test was carried out similarly to example 1. The result is shown in table 1 and FIG. 1.

Comparative Example 3

The silver nanoparticle dispersion was prepared similarly to example 1 excluding a point that the surface of the silver nanoparticle was coated with hexanoic acid which was not the amine compound defined by amine A, and butyl amine was added as amine B instead of triethanol amine, and the bonding test was carried out similarly to example 1. The result is shown in table 1.

TABLE 1

| | | | Example 1 | Example 2 | Comparative example 1 | Comparative example 2 | Comparative example 3 |
|---|---|---|---|---|---|---|---|
| Silver nano-particle dispersion | Slurry | Octyl amine (g) | 0.85 | 0.85 | 0.85 | 0.85 | |
| | | Hexanoic acid (g) | | | | | 0.85 |
| | | Octane diol (g) | 0.15 | 0.15 | 0.15 | 0.15 | 0.15 |
| | Sintering aid | Triethanol amine (g) | 0.002 | | | | |
| | | Butyl amine (g) | | 0.002 | | | 0.002 |
| | | Diglycol acid (g) | | | | 0.002 | |
| Property | | Share strength (MPa) | 15.4 | 11.8 | 7.2 | 5.9 | 0.5 |

From table 1, by allowing amine B to be present in the dispersion medium, it was confirmed that an excellent bonding strength (share strength) could be obtained, because sintering of the silver nanoparticles was sufficient even at a low temperature of 150° C. Meanwhile, when amine B was not allowed to be present in the dispersion medium, it was confirmed that sintering of the silver nanoparticles was insufficient, and the bonding strength was low. This matter was clear from the SEM photograph of the bonded portion after the bonding test. That is, from the SEM photograph shown in FIG. 1(a) and FIG. 1(b), it was confirmed that the silver nanoparticles were sufficiently sintered, but it was confirmed that sintering of the silver nanoparticles was insufficient from the photograph shown in FIG. 1(c) and FIG. 1(d).

It was also confirmed that an excellent share strength could be obtained in a combination of amine A as octyl amine, and amine B as triethanol amine or butyl amine.

Example 3

Terpineol 3.17 g (mixture of structural isomers produced by Wako Pure Chemical Industries, Ltd.) was added as a dispersion medium, into the silver nanoparticle slurry 30 g prepared in example 1, and the mixture was stirred by shaking by hand for 1 minute, and thereafter allowed to stand for 1 hour to remove a supernatant liquid, to thereby obtain a slurry in which silver nanoparticles were dispersed in the terpineol.

Triethanol amine 0.006 g (special grade and having a molecular weight of 149.2 produced by Wako Pure Chemical Industries, Ltd.) was mixed as amine B into the slurry 3.0 g, and the mixture was kneaded using a kneading defoamer (V-mini300 produced by EME Inc.) under conditions of a revolution speed of 1400 rpm, and a rotation speed of 700 rpm for 30 seconds, to thereby prepare the silver nanoparticle dispersion in a paste state.

(Measurement of Resistivity of a Conductive Film)

A conductive film was formed using the obtained silver nanoparticle dispersion paste. First, a metal mask (having a mask thickness of 50 μm) was placed on an alumina substrate, and the alumina substrate was coated with the silver nanoparticle dispersion paste by a printing method using a metal squeegee, to thereby form a pattern of 10 mm square. After coating, the alumina substrate was heated from the room temperature to 120° C., and held at 120° C. for 5 minutes, to thereby form the conductive film on the alumina substrate. A volume resistivity of the obtained conductive film was measured by a four probe method. The result is shown in table 2.

Example 4

The silver nanoparticle dispersion was prepared similarly to example 3 excluding a point that diethanol amine was added as amine B instead of triethanol amine, and the volume resistivity of the conductive film was measured similarly to example 3. The result is shown in table 2.

Example 5

The silver nanoparticle dispersion was prepared similarly to example 3 excluding a point that butyl amine was added as amine B instead of triethanol amine, and the volume resistivity of the conductive film was measured similarly to example 3. The result is shown in table 2.

Comparative Example 4

The silver nanoparticle dispersion was prepared similarly to example 3 excluding a point that triethanol amine was not added as amine B, and the volume resistivity of the conductive film was measured similarly to example 3. The result is shown in table 2.

Example 6

Butyl carbitol acetate (BCA) 3.17 g was added as a dispersion medium, into the silver nanoparticle slurry 30 g prepared in example 1, and the mixture was stirred by shaking by hand for 1 minute, and thereafter allowed to stand for 1 hour to remove a supernatant liquid, to thereby obtain a slurry in which silver nanoparticles were dispersed in BCA.

Triethanol amine 0.006 g (special grade and having a molecular weight of 149.2 produced by Wako Pure Chemical Industries, Ltd.) was mixed into the slurry 3.0 g and amorphous polyester resin (Bylon500), and the mixture was kneaded using a kneading defoamer (V-mini300 produced by EME Inc.) under conditions of a revolution speed of 1400 rpm, and a rotation speed of 700 rpm for 30 seconds, to thereby prepare the silver nanoparticle dispersion in a paste state. The conductive film was formed using the prepared silver nanoparticle dispersion paste, and the volume resistivity of the conductive film was measured similarly to example 3. The result is shown in table 2.

Example 7

The silver nanoparticle dispersion was prepared similarly to example 6 excluding a point that diethanol amine was added as amine B instead of triethanol amine, and the volume resistivity of the conductive film was measured similarly to example 3. The result is shown in table 2.

Comparative Example 5

The silver nanoparticle dispersion was prepared similarly to example 6 excluding a point that triethanol amine was not added as amine B, and the volume resistivity of the conductive film was measured similarly to example 3. The result is shown in table 2.

TABLE 2

| | | | Example 3 | Example 4 | Example 5 | Comparative example 4 | Example 6 | Example 7 | Comparative example 5 |
|---|---|---|---|---|---|---|---|---|---|
| Silver nanoparticle dispersion | Slurry (g) | | 3.0 | 3.0 | 3.0 | 3.0 | 3.0 | 3.0 | 3.0 |
| | Sintering aid (g) | Triethanol amine | 0.006 | | | | 0.006 | | |
| | | Diethanl amine | | 0.006 | | | | 0.006 | |
| | | Butyl amine | | | 0.006 | | | | |
| Property | Volume resistivity | | 21.5 μΩ·cm | 6.4 μΩ·cm | 61.8 μΩ·cm | 201.6 μΩ·cm | 1.8 mΩ·cm | 0.9 mΩ·cm | 79 mΩ·cm |

From table 2, it was found that by allowing amine B to be present in the dispersion medium, sintering of the silver nanoparticles in the conductive film was sufficient even at a low temperature of 120° C., and therefore a low volume resistivity could be obtained. Meanwhile, when amine B was not allowed to be present in the dispersion medium, sintering of the silver nanoparticle was insufficient, and the silver nanoparticles were not in a sufficient contact state in the conductive film, and therefore it was confirmed that the volume resistivity was increased.

Further, in the combination of amine A as octyl amine, amine B as triethanol amine, diethanol amine, or butyl amine, it was confirmed that excellent volume resistivity could be obtained.

The invention claimed is:

1. A metal nanoparticle dispersion, comprising:
   metal nanoparticles, with at least a part of a surface of each particle coated with amine A having 8 or more carbon atoms; and
   a dispersion medium for dispersing the metal nanoparticles,
   wherein the dispersion medium contains amine B which is primary, secondary, or tertiary amine having 7 or less carbon atoms, and which is linear alkyl amine or alkanol amine, and
   0.1 to 1 pts.mass. of the amine B is contained, based on 100 pts.mass. of the metal nanoparticles.

2. The metal nanoparticle dispersion according to claim 1, wherein an average particle size of the metal nanoparticles is 1 to 200 nm.

3. The metal nanoparticle dispersion according to claim 1, wherein a metal constituting the metal nanoparticles contains silver.

4. The metal nanoparticle dispersion according to claim 1, wherein the amine A is octyl amine, and the amine B is at least one selected from the group consisting of triethanolamine, diethanolamine, and butylamine.

5. A method for producing a metal nanoparticle dispersion, comprising:
   making amine A having 8 or more carbon atoms, adhered to at last a part of each surface of metal nanoparticles; and
   adding amine B which is primary, secondary, or tertiary amine having 7 or less carbon atoms, and which is linear alkyl amine or alkanol amine, to a dispersion medium for dispersing the metal nanoparticles so that 0.1 to 1 pts.mass. of the amine B is contained, based on 100 pts.mass. of the metal nanoparticles.

6. A bonding method, comprising bonding a plurality of objects to be bonded, using a bonding material containing the metal nanoparticle dispersion of claim 1.

7. The metal nanoparticle dispersion according to claim 1, wherein the dispersion medium is at least one selected from the group consisting of an alcohol, a diol, a terpene alcohol, and a glycol ether.

8. The method for producing the metal nanoparticle dispersion according to claim 5, wherein the dispersion medium is at least one selected from the group consisting of an alcohol, a diol, a terpene alcohol, and a glycol ether.

* * * * *